United States Patent
Chen

(10) Patent No.: US 10,668,827 B2
(45) Date of Patent: * Jun. 2, 2020

(54) BATTERY BOX STRUCTURE OF ELECTRIC VEHICLE

(71) Applicant: KWANG YANG MOTOR CO., LTD., Kaohsiung (TW)

(72) Inventor: Yi-Tso Chen, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,577

(22) Filed: Jan. 15, 2019

(65) Prior Publication Data

US 2019/0232804 A1 Aug. 1, 2019

(30) Foreign Application Priority Data

Jan. 31, 2018 (TW) .............................. 107103523 A

(51) Int. Cl.

| | |
|---|---|
| *B60K 1/04* | (2019.01) |
| *B60L 50/64* | (2019.01) |
| *B60L 50/60* | (2019.01) |
| *B62M 6/90* | (2010.01) |
| *B60L 53/80* | (2019.01) |
| *H01M 2/10* | (2006.01) |
| *B62J 43/00* | (2020.01) |

(52) U.S. Cl.
CPC ................ *B60L 50/64* (2019.02); *B60K 1/04* (2013.01); *B60L 50/66* (2019.02); *B60L 53/80* (2019.02); *B62M 6/90* (2013.01); *H01M 2/1083* (2013.01); *B60K 2001/0455* (2013.01); *B60K 2001/0466* (2013.01); *B60K 2001/0488* (2013.01); *B60L 2200/12* (2013.01); *B60Y 2200/12* (2013.01); *B60Y 2200/126* (2013.01); *B62J 43/00* (2020.02); *B62K 2202/00* (2013.01)

(58) Field of Classification Search
CPC .................. B60K 1/04; B60K 2202/00; B60K 2001/0488; B60K 2001/0416; B60L 50/64; B60L 50/66; H01M 2/1083; B60R 25/40

See application file for complete search history.

(56) References Cited

U.S. PATENT DOCUMENTS 10,384,562 B1 * 8/2019 Chen ........................ B62M 6/90

* cited by examiner

*Primary Examiner* — John D Walters
*Assistant Examiner* — James J Triggs
(74) *Attorney, Agent, or Firm* — Leong C. Lei

(57) ABSTRACT

An electric vehicle includes a frame unit and a vehicle body cover unit. The frame unit includes tread boards extending toward a rear side of a vehicle body. The tread tubes are arranged in a left and right pairwise form as a left tread tube and a right tread tube. The vehicle body cover unit includes a thread board shielding the left tread tube and the right tread tube. A battery box that receives and holds a battery is shaft-supported on the frame unit. The battery box has two sides provided with support shafts. The battery box is shaft-supported on the frame unit by the support shafts in a left-right direction. The battery box is rotatable about a rotation center defined by the support shafts in a front-rear direction to an open position or a storage position so as to facilitate removal of the battery from the battery box.

20 Claims, 13 Drawing Sheets

BATTERY BOX STRUCTURE OF ELECTRIC VEHICLE

(a) TECHNICAL FIELD OF THE INVENTION

The present invention generally relates to a battery box structure of an electric vehicle, and more particularly to a battery box structure of an electric vehicle that eases lifting and removal of the battery from the electric vehicle and allows enlargement of the battery box and the battery.

(b) DESCRIPTION OF THE PRIOR ART

An electric vehicle 1 is often provided with a receiving space 12 under a tread board 11 that is arranged for supporting user's feet to rest thereon. As shown in FIG. 1, the receiving space 12 receives and holds therein a battery 13 that supplies electrical power source to the electric vehicle 1.

As shown in FIGS. 1 and 2, the battery 13 is received and held in a battery box 14. The battery 13 exhibits certain weight and size. In addition, the electric vehicle 1 must has a predetermined height above the ground so that the battery 13, together with the battery box 14, is generally arranged in a lying condition in the receiving space 12 under the tread board 11. In order to provide the tread board 11 with a desired structural strength to support the user's feet resting thereon, a reinforcement member 15 is provided between the tread board 11 and the receiving space 12. Thus, with the arrangement of the reinforcement member 15, the structural strength of the tread board 11 is improved.

The known battery box 14 as described above, is effective in receiving and holding the battery 13 therein. When service, replacement, or withdrawal for re-charging of the battery 13 become necessary, the user has to remove the tread board 11 and the reinforcement member 15 first and then, the battery box 14 that is in a lying condition must be erected. In other words, the battery box 14 must be lifted to a condition of being generally perpendicular to the receiving space 12, and then, the user is allowed to lift and remove the battery 13 located in the battery box 14. Such a operation of first removing the tread board 11 and the reinforcement member 15 and then erecting the battery box 14 in order to lift and remove the battery 13 suffers, on the one hand, the engineering complexity of removing the tread board 11 and the reinforcement member 15, and, on the other hand, severe hindrance caused by an extremely small gap between the receiving space 12 and an outer circumference of the battery box 14. In addition, since the battery 13 located in the battery box 14 is of quite a weight, the operation of erecting the battery box 14 is generally difficult.

Thus, it is a challenge of the electric vehicle industry to provide a battery box structure of an electric vehicle that helps lift and remove a battery from an electric vehicle.

SUMMARY OF THE INVENTION

The primary objective of the present invention is to provide a battery box structure of an electric vehicle, which helps overcome the drawback of inconvenience of lifting and removing a battery from a battery box of an electric vehicle.

For such a purpose, the primary technical solution of the present invention as proposed in claim 1 is to provide a battery box structure of an electric vehicle, wherein the electric vehicle at least comprises a frame unit and a vehicle body cover unit; the frame unit comprises tread tubes extending toward a rear side of a vehicle body, the tread tubes being arranged in a left and right pairwise form as a left tread tube and a right tread tube; the vehicle body cover unit at least comprises a tread board that shields the left tread tube and the right tread tube; a battery box is shaft-supported on the frame unit to receive and hold a battery, wherein the battery box has two sides that are provided with support shafts, and the battery box are shaft-supported on the frame unit by the support shafts in a vehicle body left-right direction, so that the battery box is rotatable about a rotation center defined by the support shafts in a vehicle body front-rear direction to an open position or a storage position.

For such a purpose, the primary technical solution of the present invention as proposed in claim 2 is to provide a battery box structure of an electric vehicle, wherein an opening device is arranged at one side of the battery box and the opening device comprises a power unit and a driven element drivable by the power unit; and the power unit is arranged on the tread tubes and the driven element is arranged at one side of a circumference of the battery box.

For such a purpose, the primary technical solution of the present invention as proposed in claim 3 is to provide a battery box structure of an electric vehicle, wherein the power unit comprises a power motor section and a transmission section, and the driven element is in engagement with the transmission section.

For such a purpose, the primary technical solution of the present invention as proposed in claim 4 is to provide a battery box structure of an electric vehicle, wherein the driven element comprises a curved toothed rack.

For such a purpose, the primary technical solution of the present invention as proposed in claim 5 is to provide a battery box structure of an electric vehicle, wherein the left tread tube comprises a left shaft support section and the right tread tube comprises a right shaft support section, the left shaft support section and the right shaft support section shaft-supporting the support shafts of the battery box.

For such a purpose, the primary technical solution of the present invention as proposed in claim 6 is to provide a battery box structure of an electric vehicle, wherein the support shafts of the battery box are located above a battery box center axis of the battery box in the vehicle body front-rear direction.

For such a purpose, the primary technical solution of the present invention as proposed in claim 7 is to provide a battery box structure of an electric vehicle, wherein the opening device has an electrical power source supplied with a second battery. For such a purpose, the primary technical solution of the present invention as proposed in claim 8 is to provide a battery box structure of an electric vehicle, wherein the frame unit further comprises a seat section; the vehicle body cover unit further comprises a bottom cover at a lower side of the tread board; the battery box is received in a receiving space defined by the left tread tube, the right tread tube, the tread board and the bottom cover and at least a portion of a rear end of the battery box extending further toward the rear side of the vehicle body than an orthographic projection of a front end of the seat section.

For such a purpose, the primary technical solution of the present invention as proposed in claim 9 is to provide a battery box structure of an electric vehicle, wherein the frame unit further comprises a rise section, the rise section being provided with a transverse tube; the vehicle body cover unit further comprises a bottom cover arranged at a lower side of the tread board; the battery box is received in a receiving space defined by the left tread tube, the right tread tube, the tread board and the bottom cover and when viewed from the top, at least a portion of a rear end of the battery box overlaps the transverse tube.

For such a purpose, the primary technical solution of the present invention as proposed in claim 10 is to provide a battery box structure of an electric vehicle, wherein the frame unit comprises a seat section, and the vehicle body cover unit comprises a central vehicle body cover; the central vehicle body cover is arranged at a lower side of a front end of the seat section, the battery box being received in a receiving space defined by the left tread tube, the right tread tube, the tread board and the bottom cover, at least a portion of a rear end of the battery box extending further toward the rear side of the vehicle body than the central vehicle body cover.

For such a purpose, the primary technical solution of the present invention as proposed in claim 11 is to provide a battery box structure of an electric vehicle, wherein the vehicle body cover unit further comprises a bottom cover arranged at a lower side of the tread board; the tread board comprises a central tread board and a peripheral tread board; the bottom cover comprises a central bottom cover and a peripheral bottom cover; the central tread board is fixed to an upper surface of the battery box and the central bottom cover is fixed to a lower surface of the battery box; the central tread board on the upper surface of the battery box and the central bottom cover fixed to the lower surface of the battery box are openable in synchronization with the battery box, so that when the battery box is opened to a condition of being generally at a right angle with respect to a ground surface, the rear end of the battery box projects beyond a lower edge of the peripheral bottom cover in a direction toward the ground surface.

For such a purpose, the primary technical solution of the present invention as proposed in claim 12 is to provide a battery box structure of an electric vehicle, wherein the frame unit comprises side frame sections arranged in a left and right pairwise form, an article storage box being provided on the side frame sections of the frame unit, the battery box being shaft-supported on the side frame sections of the frame unit in a manner of being shaft-supported in the vehicle body left-right direction, and is received in the article storage box.

For such a purpose, the primary technical solution of the present invention as proposed in claim 13 is to provide a battery box structure of an electric vehicle, wherein the left tread tube, the right tread tube, the tread board and the bottom cover define a receiving space, and the receiving space receives the battery box therein.

For such a purpose, the primary technical solution of the present invention as proposed in claim 14 is to provide a battery box structure of an electric vehicle, wherein the frame unit further comprises a rise section, the rise section of the frame unit being provided with a support frame projecting toward the rear side of the vehicle body, the battery box being shaft-supported on the support frame in a manner of being shaft-supported in the vehicle body left-right direction.

For such a purpose, the primary technical solution of the present invention as proposed in claim 15 is to provide a battery box structure of an electric vehicle, wherein the frame unit further comprises a head tube, the head tube of the frame unit being provided with a mounting frame projecting toward a front side of the vehicle body, the battery box being shaft-supported on the mounting frame in a manner of being shaft-supported in the vehicle body left-right direction.

The efficacy that the primary technical solution of the present invention proposed in claim 1 is that the battery box is rotatable about a rotation center defined by the support shafts, in the vehicle body front-rear direction, to a open position or a storage position to thereby facilitate lifting and removal of the battery from the battery box.

The efficacy that the primary technical solution of the present invention proposed in claim 2 is that the installation of the opening device is made easy. The efficacy that the primary technical solution of the present invention proposed in claim 3 is that effects of opening and storage of the opening device are ensured.

The efficacy that the primary technical solution of the present invention proposed in claim 4 is that reliability of the operation of the opening device is enhanced.

The efficacy that the primary technical solution of the present invention proposed in claim 5 is that rotatable arrangement of the battery box is made easy.

The efficacy that the primary technical solution of the present invention proposed in claim 6 is that opening of the battery box is made easy.

The efficacy that the primary technical solution of the present invention proposed in claim 7 is that the stability of electrical power supply of the opening device can be ensured.

The efficacy that the primary technical solution of the present invention proposed in claim 8 is that interference of an enlarged battery box with other components can be avoided and thereby enhance the utilization of the battery box.

The efficacy that the primary technical solution of the present invention proposed in claim 9 is that interference of an enlarged battery box with other components can be avoided and thereby enhance the utilization of the battery box.

The efficacy that the primary technical solution of the present invention proposed in claim 10 is that interference of an enlarged battery box with other components can be avoided and thereby enhance the utilization of the battery box.

The efficacy that the primary technical solution of the present invention proposed in claim 11 is that withdrawal of the battery from the battery box by a user can be facilitated and at the same time, interference of an enlarged battery box with other components can be avoided and thereby enhance the utilization of the battery box.

The efficacy that the primary technical solution of the present invention proposed in claim 12 is that the space of the electric vehicle can be fully used and the battery received in the battery box is provided with a feature of shielding.

The efficacy that the primary technical solution of the present invention proposed in claim 13 is that the space of the electric vehicle can be fully used and the battery received in the battery box is provided with a feature of shielding.

The efficacy that the primary technical solution of the present invention proposed in claim 14 is that the space of the electric vehicle can be fully used and the battery received in the battery box is provided with a feature of shielding.

The efficacy that the primary technical solution of the present invention proposed in claim 15 is that the space of the electric vehicle can be fully used and the battery received in the battery box is provided with a feature of shielding.

DETAILED DESCRIPTION OF THE PREFERRED EMBODIMENTS

Figure 1:
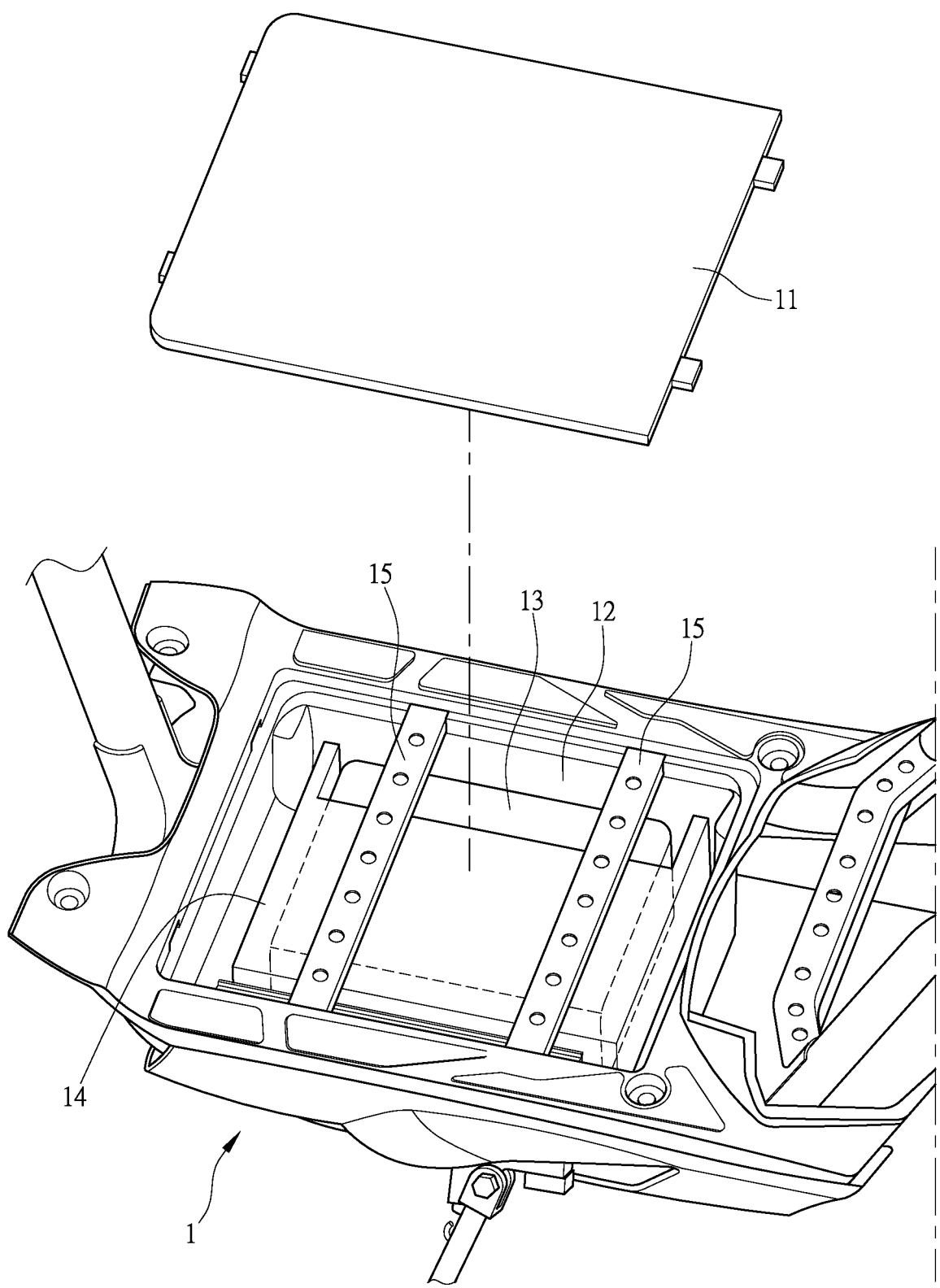
FIG. 1 is a schematic view illustrating a conventional electric vehicle battery box.
Figure 2:
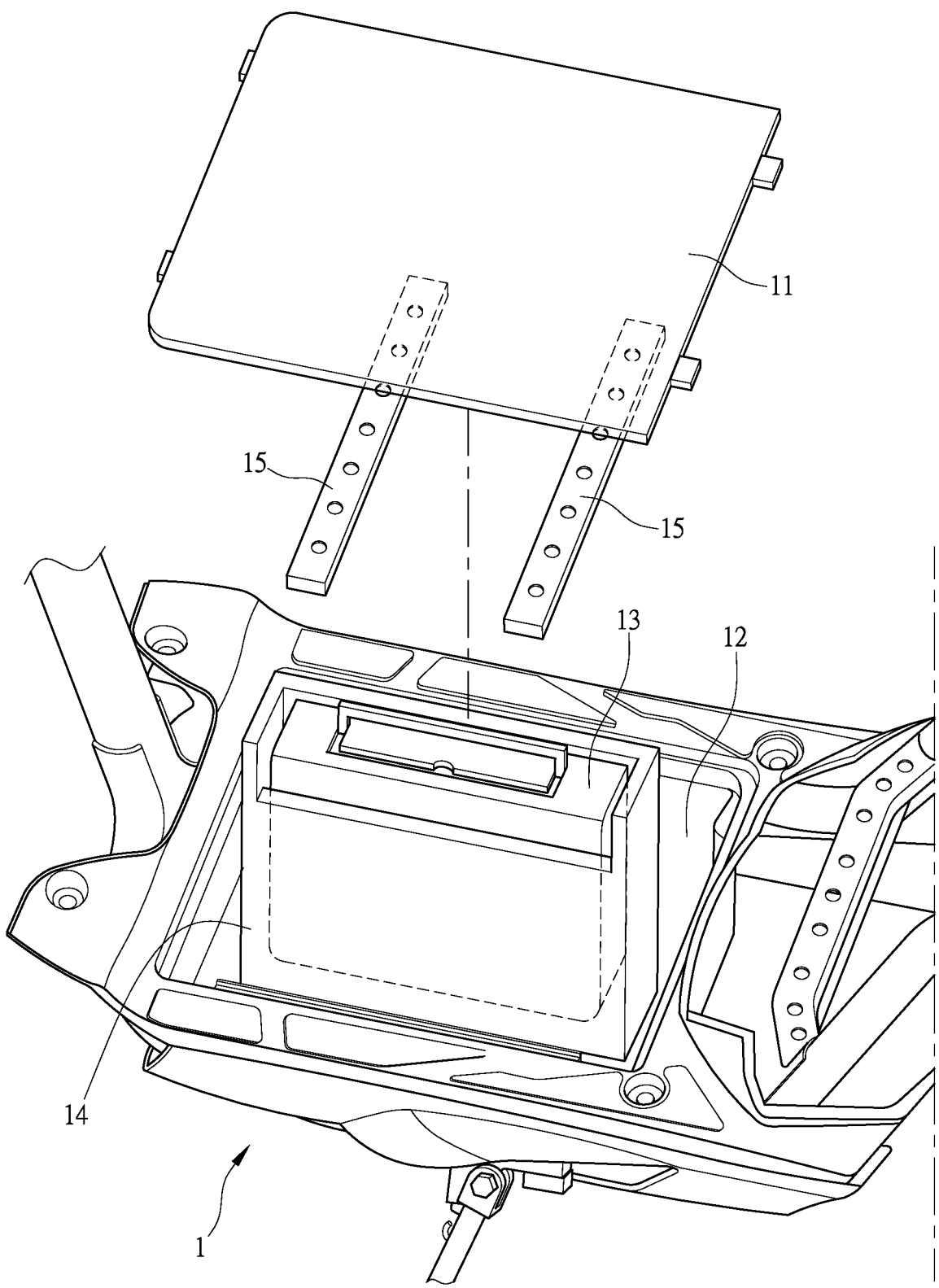
FIG. 2 is a schematic view illustrating withdrawal of the conventional electric vehicle battery box.
Figure 3:
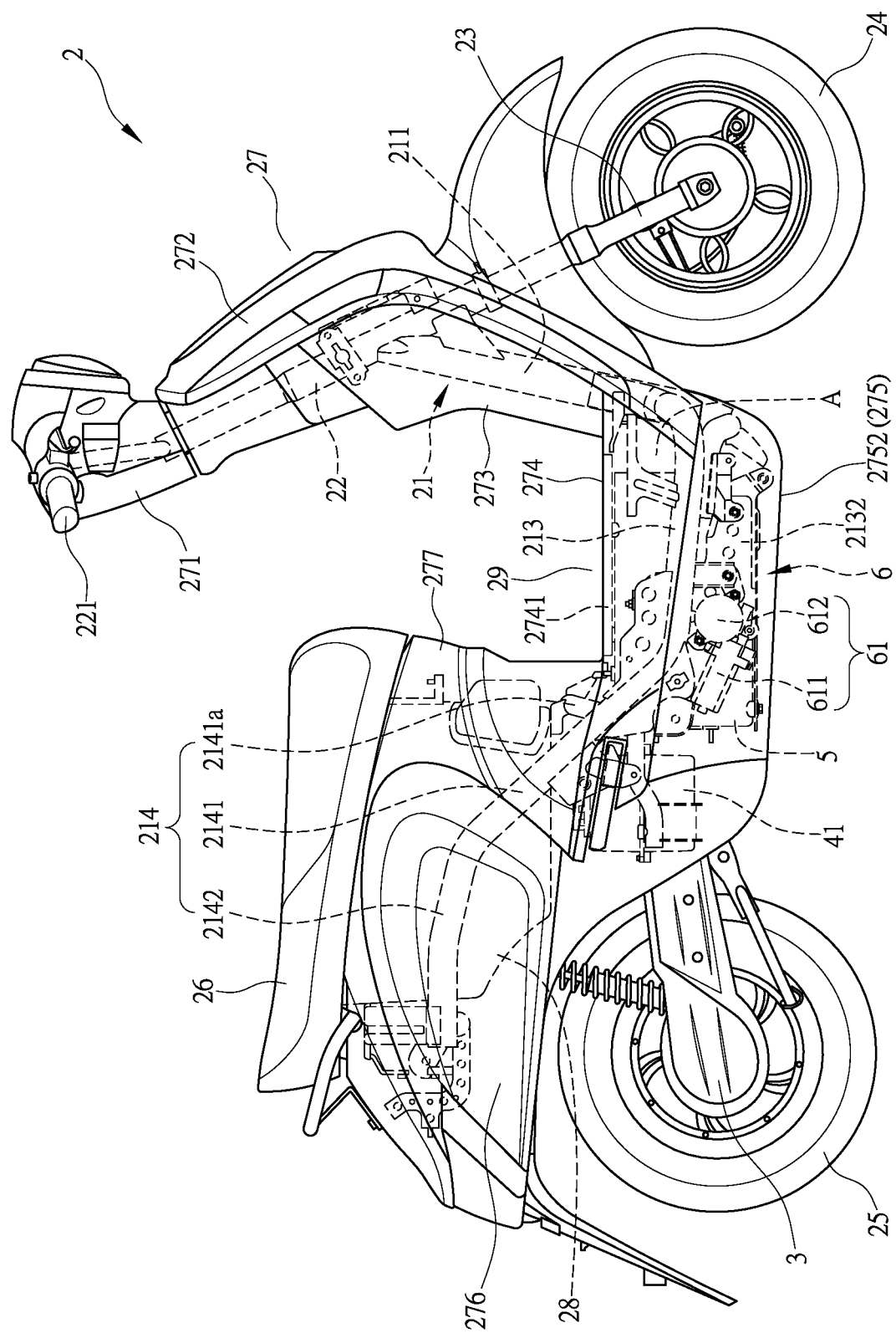
FIG. 3 is a side elevational view illustrating an electric vehicle according to the present invention.

Firstly, referring to FIGS. 3, 4, 6, and 7, the present invention provides a battery box structure of an electric vehicle. A frame unit 21 of the electric vehicle 2 is provided, at a front side, with a head tube 22. The head tube 22 is provided, at an upper side thereof, with a steering mechanism 221. The steering mechanism 221 is connected, at a lower side thereof, to a front fork unit (front shock absorber) 23. The front fork unit 23 is provided, at a lower side thereof and in a rotatable manner, with a front wheel 24. The frame unit 21 is provided with a main tube 211 extending from the head tube 22 in a direction toward a rear side of a vehicle body. The main tube 211 is provided, as being further extended toward the rear side of the vehicle body, with tread tubes. The tread tubes are arranged pairwise in a left-right direction as a left tread tube 212 and a right tread tube 213. The left tread tube 212 and the right tread tube 213 are provided with rear frames 214 that are arranged pairwise in the left-right direction and extend toward the rear side of the vehicle body. The rear frames 214 comprise a rise section 2141 and a side frame section 2142. A transverse tube 2141a is arranged between the rise sections 2141. A rear wheel 25 is arranged rearward of and under the rear frames 214. A driving motor 3 is arranged at one side of the rear wheel 25 such that the driving motor 3 is operable to drive the rear wheel 25 in order to cause the electric vehicle 2 to more forward. A seat section 26 that is located above the rear wheel 25 is arranged rearward of the steering mechanism 221 such that a spacing distance is provided between the seat section 26 and the steering mechanism 221. The electric vehicle 2 is provided, on an outside thereof, with a vehicle body cover unit 27. The vehicle body cover unit 27 comprises a head cover 271 housing the steering mechanism 221, a front head cover 272 arranged at a lower side of the head cover 271 and housing a front end of the vehicle body, and a knee-shielding cover 273 arranged at a rear side of the front head cover 272. A tread board 274 is arranged between the steering mechanism 221 and the seat section 26 at a lower side thereof. A bottom cover 275 is arranged at a lower side of the tread board 274. The electric vehicle 2 is provided, on two sides thereof, with side vehicle body covers 276 at a lower side of the seat section 26. A central vehicle body cover 277 is provided in front of and at a lower side of the seat section 26. An article storage box 28 is provided at a lower side of the seat section 26 and an upper side of the article storage box 28 is shielded by the seat section 26. The electric vehicle 2 is provided with a power source, of which an example that is shown in the drawings includes a driving motor 3 driving the rear wheel 25. In practice, the electric vehicle 2 of the present invention can alternatively provided with a frontward-arranged motor that drives, by means of a chain or a belt, the rear wheel 25, or a driving mechanism that is made up of a motor and a transmission box to drive the rear wheel 25. It is noted here that the present invention is not limited to the specific way of driving the rear wheel 25 with the driving motor 3.

As shown in FIGS. 3, 4, 5, 6, and 7, the tread board 274 forms a foot support section 29, and the foot support section 29 functions to receive a rider's feet to place thereon. The tread board 274 comprises a central tread board 2741 and a peripheral tread board 2742 surrounding the central tread board 2741. The bottom cover 275 comprises a central bottom cover 2751 and a peripheral bottom cover 2752 surrounding the central bottom cover 2751. The tread board 274 and the bottom cover 275, and also the left tread tube 212 and the right tread tube 213, define a receiving space A. The receiving space A receives and holds therein a battery 4. The battery 4 is electrically connected with the driving motor 3, in order to provide electrical power to the driving motor 3 to drive the rear wheel 25 to rotate. As such, a control device (not shown in the drawings) provided on the steering mechanism 221 can be operated to activate the driving motor 3 to drive the rear wheel 25 to rotate so as to cause the electric vehicle 2 to move.

As shown in FIGS. 3, 4, 5, 6, 7, and 8, the battery 4 is received in a battery box 5. The battery box 5 is received in a receiving space A defined by the left tread tube 212 and the right tread tube 213 in a manner of being arranged in a vehicle body front-rear direction of the electric vehicle 2. The left tread tube 212 is provided with a left shaft support section 2121, and the right tread tube 213 is provided with a right shaft support section 2131. Speaking more precisely, the battery box 5 is provided, on two opposite sides thereof, with support shafts 51 that are extended outward in a vehicle body left-right direction. The support shafts 51 that are arranged on the two sides of the battery box 5 are arranged above a battery box center axis 5a of the battery box 5 that extends in the vehicle body front-rear direction. As such, the battery box 5 is supported by the support shafts 51, in a manner of being shaft-supported by shafts in the vehicle body left-right direction, on the left shaft support section 2121 of the left tread tube 212 and the right shaft support section 2131 of the right tread tube 213. An upper surface of the battery box 5 is fixed to the central tread board 2741, and a lower surface of the battery box 5 is fixed to the central bottom cover 2751. One side of the battery box 5 is provided with an opening device 6.

As shown in FIGS. 4, 5, 6, 7, 8, and 9, the opening device 6 comprises a power unit 61 and a driven element 62 that can be driven by the power unit 61. The power unit 61 is fixed to a mounting brace 2132 extended downward from the right tread tube 213. The power unit 61 comprises a power motor section 611 and a transmission section 612. The driven element 62 comprises a toothed member, or more precisely, a curved toothed rack. The driven element 62 is mounted to one side of the battery box 5, which is the right side shown in the drawings as an example for illustration. The driven element 62 is set in engagement with the transmission section 612 of the power unit 61. An electrical power source of the opening device 6 is supplied with a second battery 42 arranged at a lower side of a front portion of the article storage box 28. The steering mechanism 221 is provided with a control button (not shown in the drawings) that controls operation of the opening device 6. As such, the control button can be actuated to put the opening device 6 into operation for causing the battery box 5 to rotate, about a rotation center defined by the support shafts 51, in a manner of facing toward the vehicle body front-rear direction, to an open position or a storage position in order to be opened in a condition of generally defining a right angle with respect to ground surface, thereby allowing a user to withdraw or remove the battery 4 from the battery box 5. The opening device 6 can be arranged at the left side or the right side of the battery box 5, and in other words, the opening device 6 can be arranged on the left tread tube 212 or the right tread tube 213. Being arranged on the right tread tube 213 as shown in the instant embodiment is taken as an example for illustration; however, this invention is not limited to such an embodiment.

Figure 4:
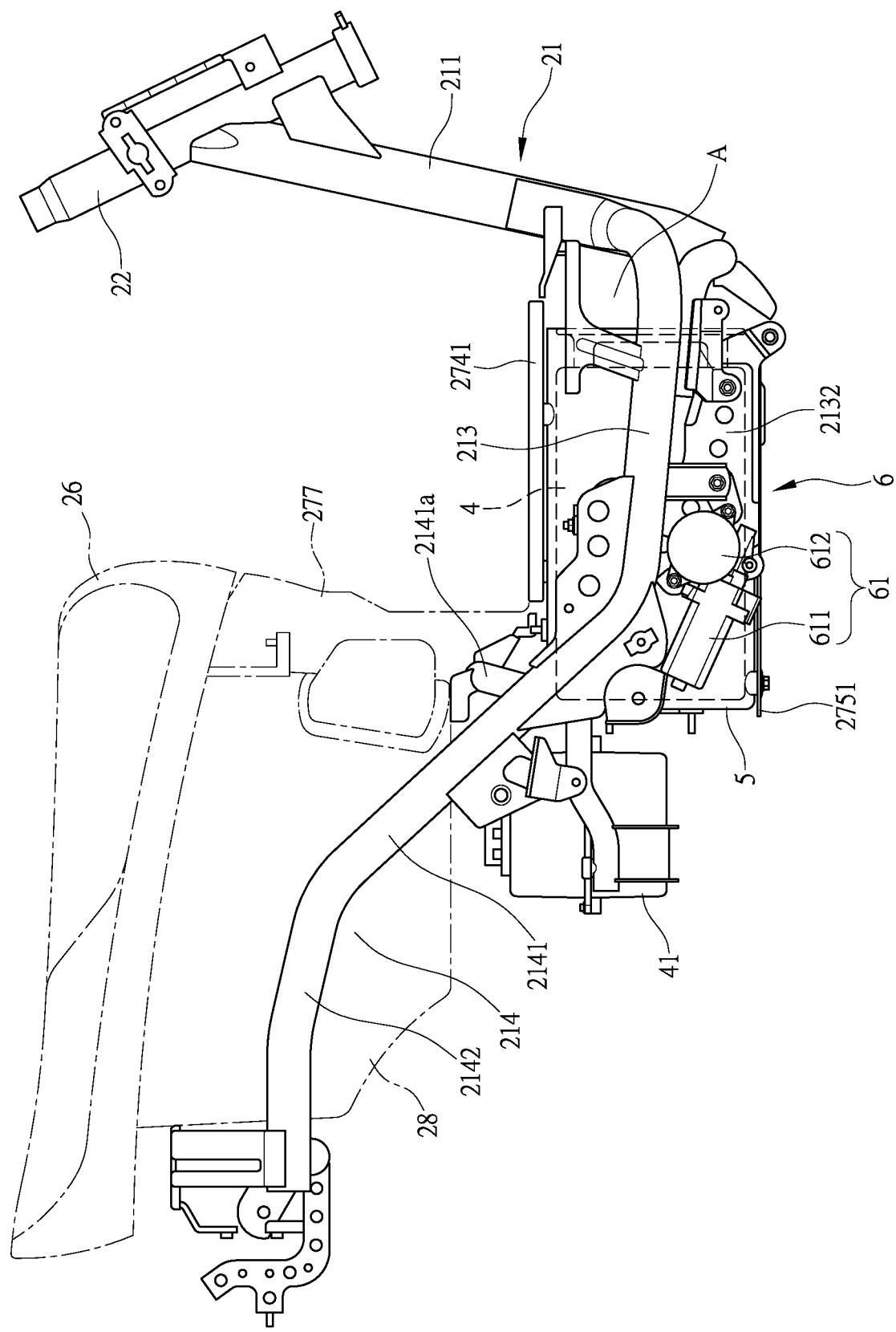
FIG. 4 is a schematic view illustrating an arrangement of a battery box of the electric vehicle according to the present invention.

As shown in FIG. 4, the battery box 5 is stored, in a manner of being shaft-supported, in the receiving space A under the foot support section 29, wherein at least a portion of a rear end of the battery box 5 is extended further toward the rear side of the vehicle body of the electric vehicle 2 than an orthographic projection of a front end of the seat section 26 so that the storage of the battery box 5 can be achieved with better utilization of the space of the electric vehicle 2 thereby allowing the battery box 5 and the battery 4 received and held in the battery box 5 to be enlarged.

As shown in FIG. 4, the battery box 5 is stored, in a manner of being shaft-supported, in the receiving space A under the foot support section 29, wherein at least a portion of a rear end of the battery box 5 is extended further toward the rear side of the vehicle body of the electric vehicle 2 than the central vehicle body cover 277 so that the storage of the battery box 5 can be achieved with better utilization of the space of the electric vehicle 2 thereby allowing the battery box 5 and the battery 4 received and held in the battery box 5 to be enlarged.

Figure 5:
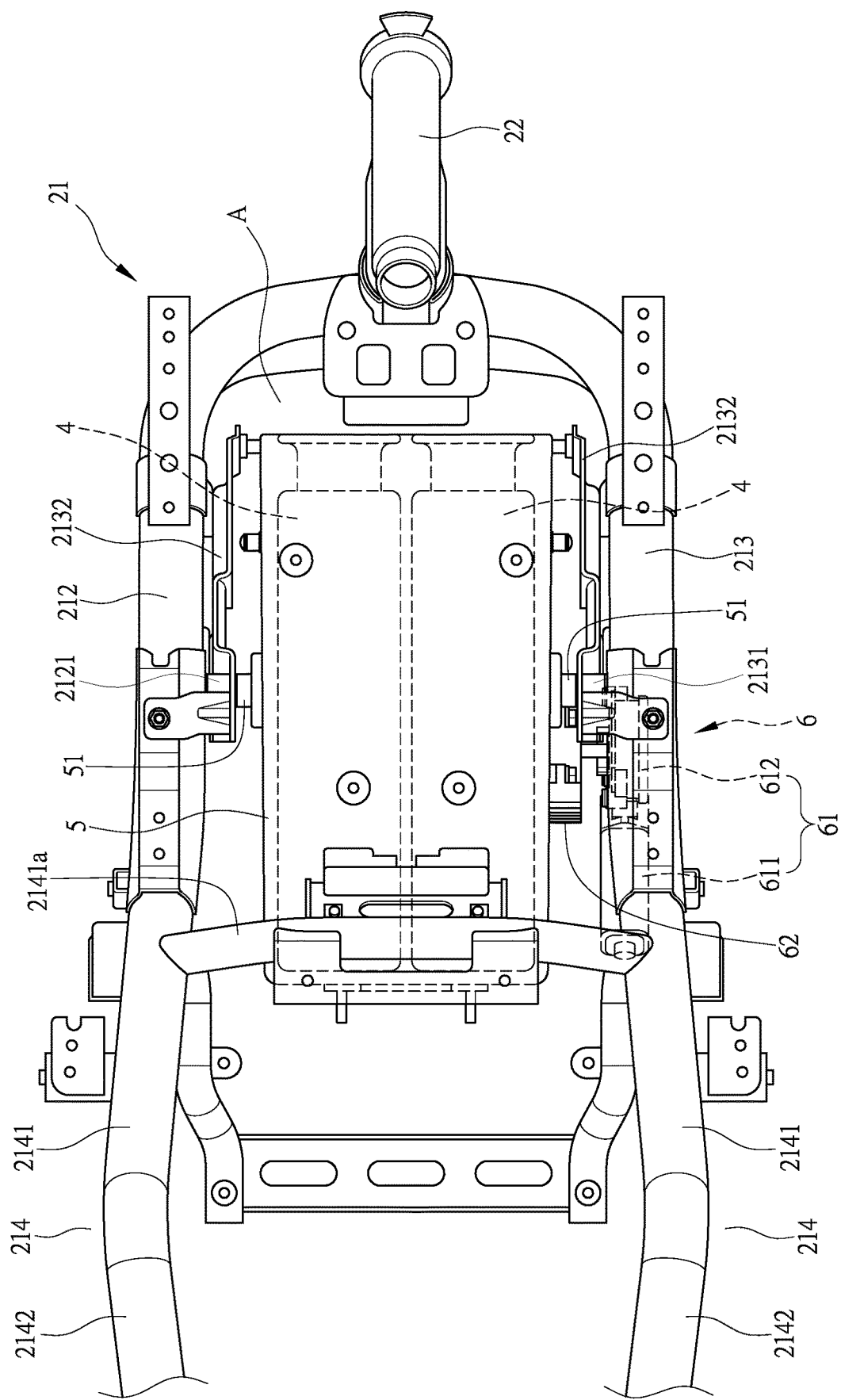
FIG. 5 is a top plan view illustrating the arrangement of the battery box of the electric vehicle according to the present invention.
Figure 6:
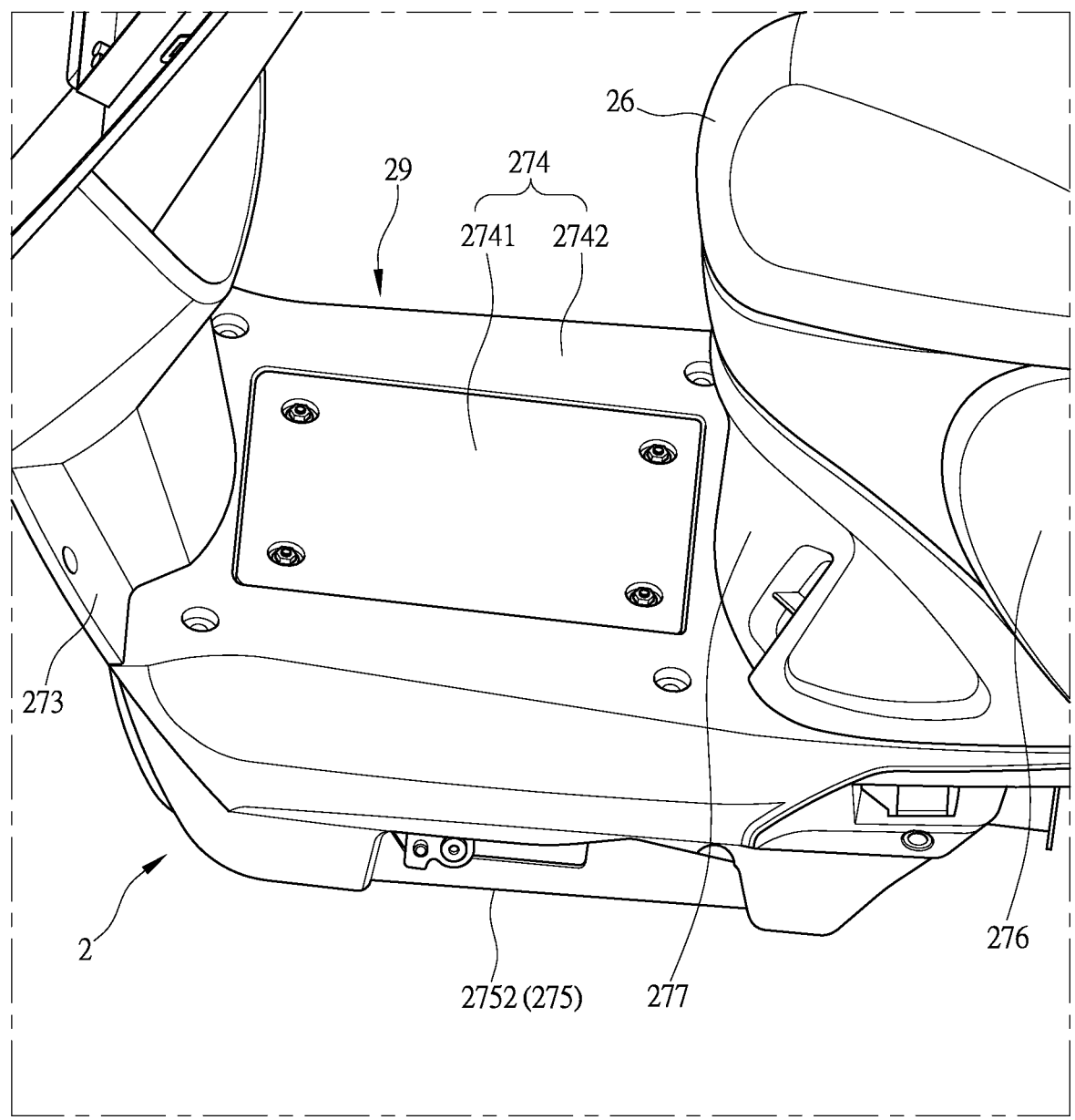
FIG. 6 is a schematic view illustrating a tread board of the electric vehicle according to the present invention.
Figure 7:
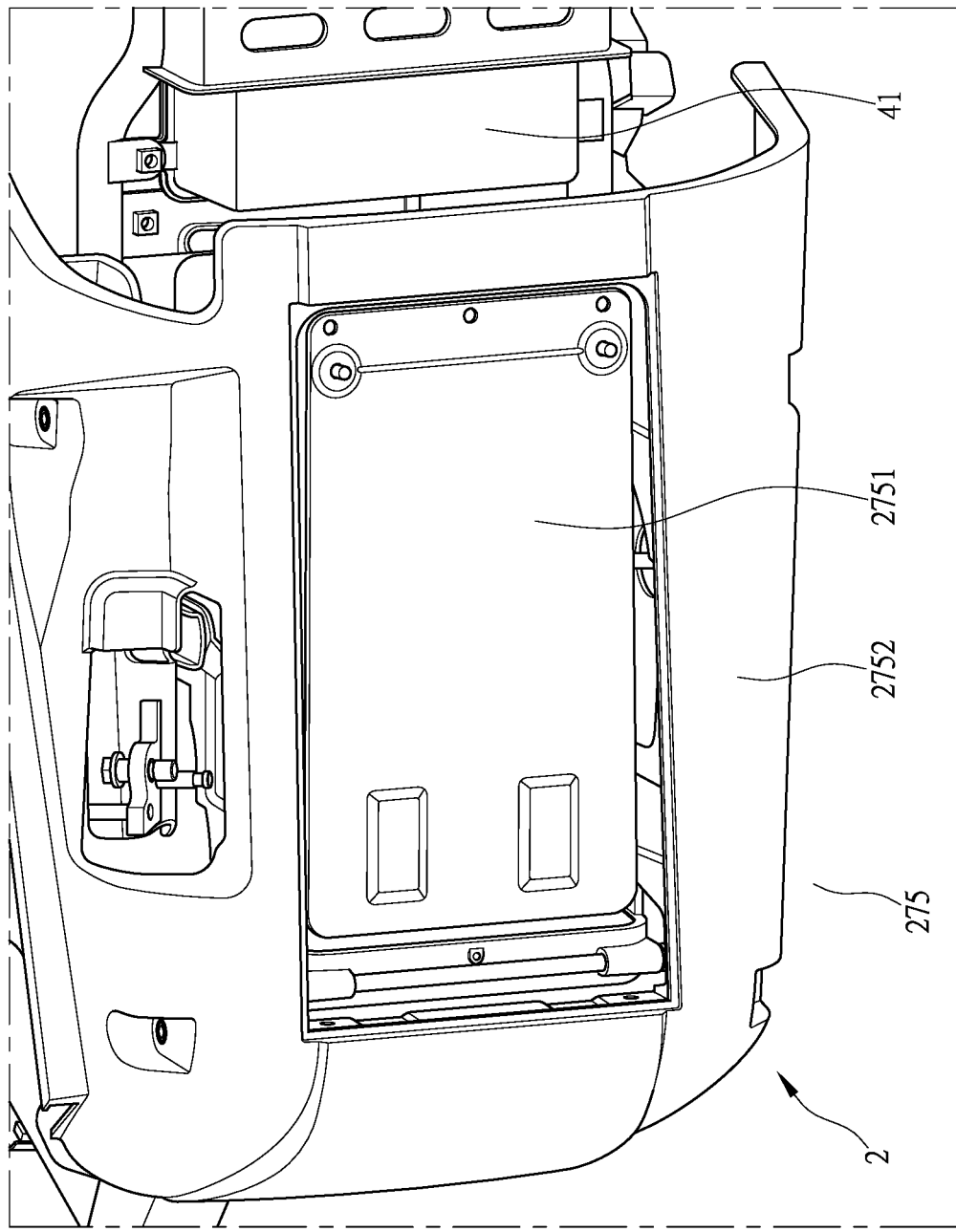
FIG. 7 is a schematic view illustrating a bottom cover of the electric vehicle according to the present invention.
Figure 8:
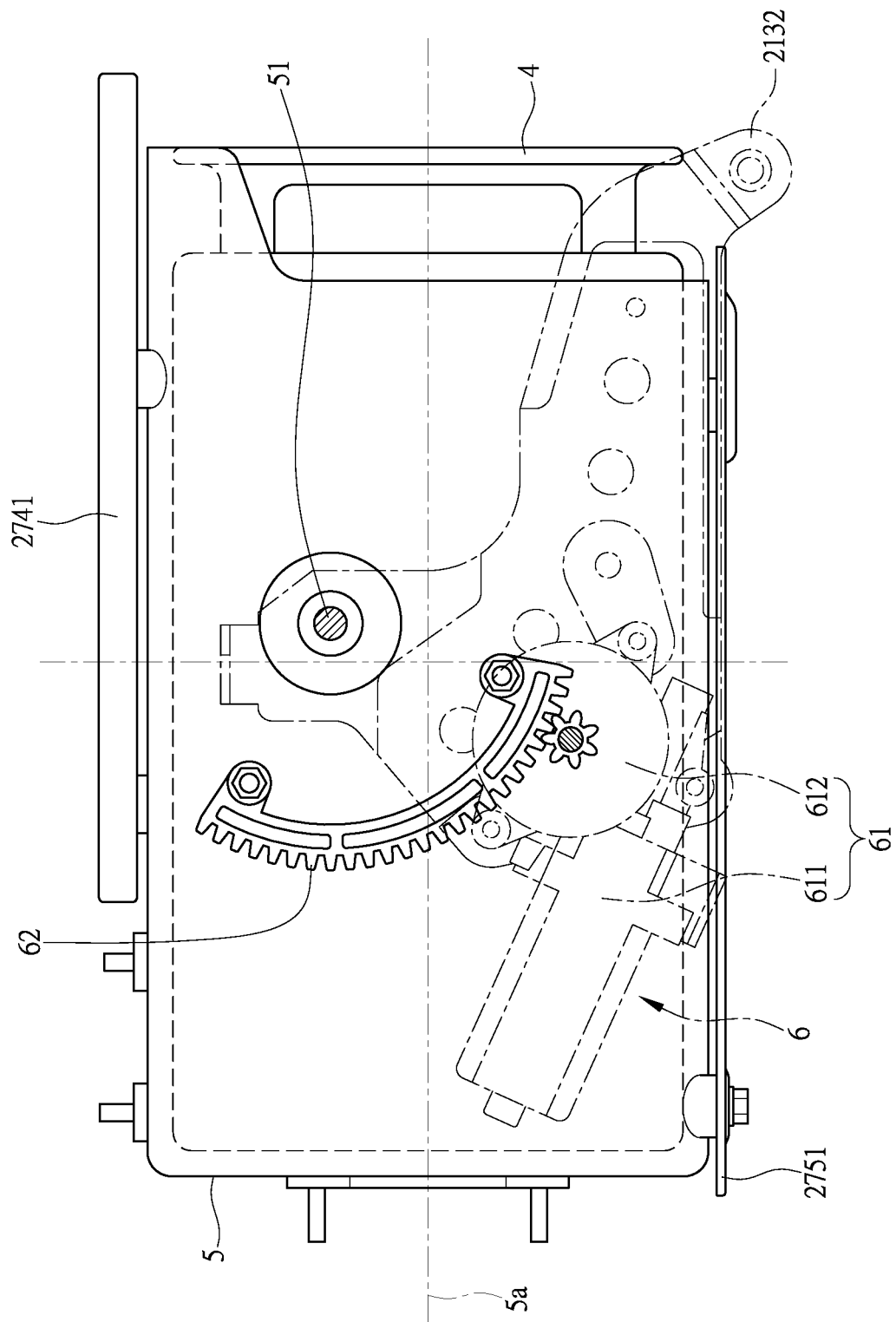
FIG. 8 is a schematic view illustrating the battery box and an opening device according to the present invention.
Figure 9:
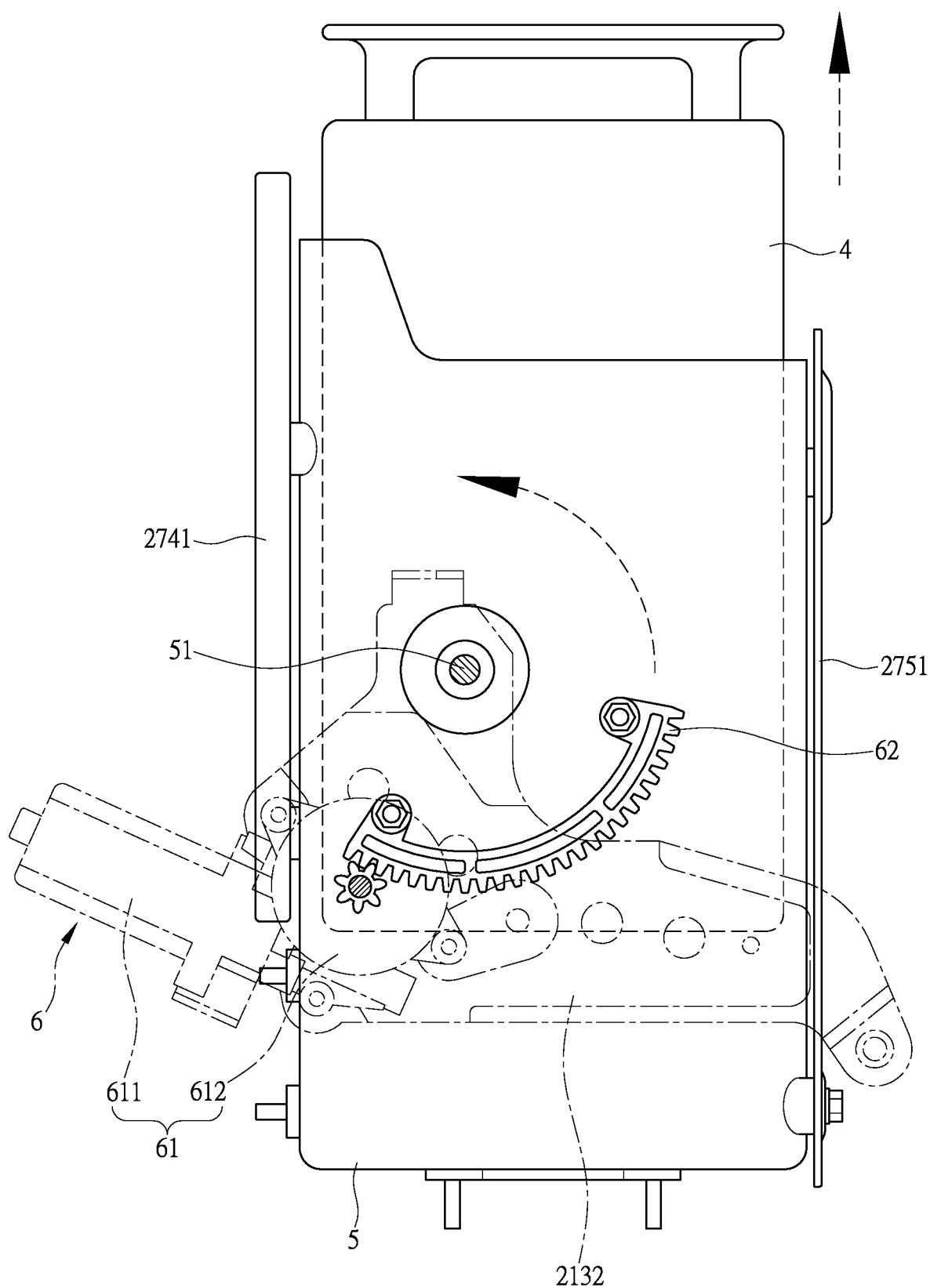
FIG. 9 is a schematic view illustrating an operation of FIG. 8.

As shown in FIG. 5, the battery box 5 is stored, in a manner of being shaft-supported, in the receiving space A under the foot support section 29, wherein, as viewed from top, at least a portion of a rear end of the battery box 5 overlaps the transverse tube 2141a, so that the storage of the battery box 5 can be achieved with better utilization of the space of the electric vehicle 2 thereby allowing the battery box 5 and the battery 4 received and held in the battery box 5 to be enlarged.

Figure 10:
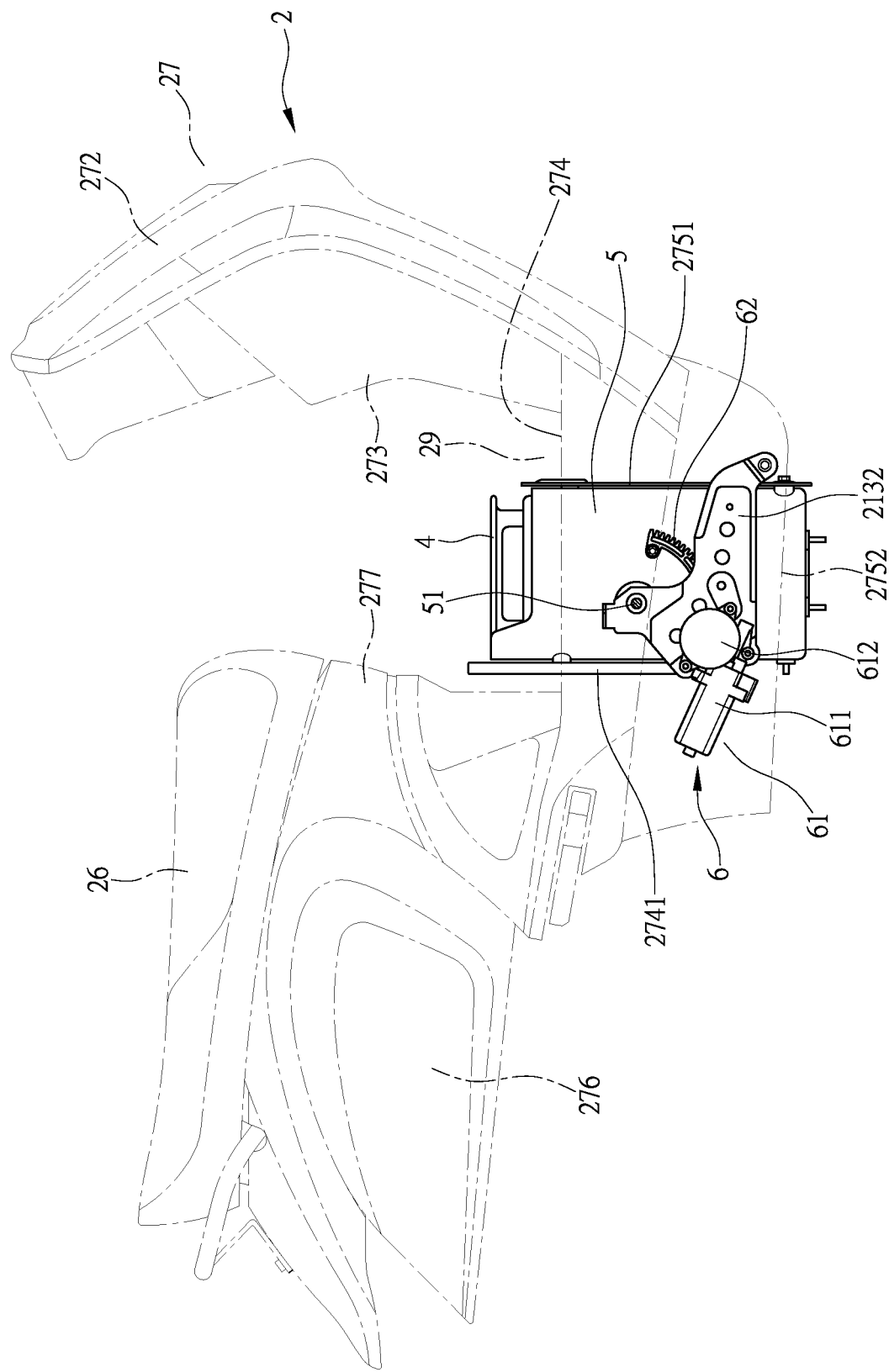
FIG. 10 is a schematic view illustrating opening of the battery box the electric vehicle according to the present invention.

As shown in FIG. 10, the battery box 5 is stored, in a manner of being shaft-supported, in the receiving space A under the foot support section 29, wherein when the battery box 5 is being opened by the opening device 6, a front end of the battery box 6 is moved from a front side of the vehicle body toward the rear side of the vehicle body, and a rear end of the battery box 5 is moved from the rear side of the vehicle body toward the front side of the vehicle body, and the central tread board 2741 that is fixed to the upper surface of the battery box 5 and the central bottom cover 2751 that is fixed to the lower surface of the battery box 5 are opened in synchronization with the battery box 5, and finally, the battery box 5 reaches an opened condition as being generally at a right angle with respect to the ground surface. Under this condition, the rear end (lower end) of the battery box 5 projects beyond a lower edge of the peripheral bottom cover 2752 in a direction toward the ground surface, so that the user may withdraw or remove the battery 4 from the battery box 5, effectively avoiding interference of the battery box 5 as being enlarged with other components, thereby effectively enhancing the utilization of the battery box 5.

Figure 11:
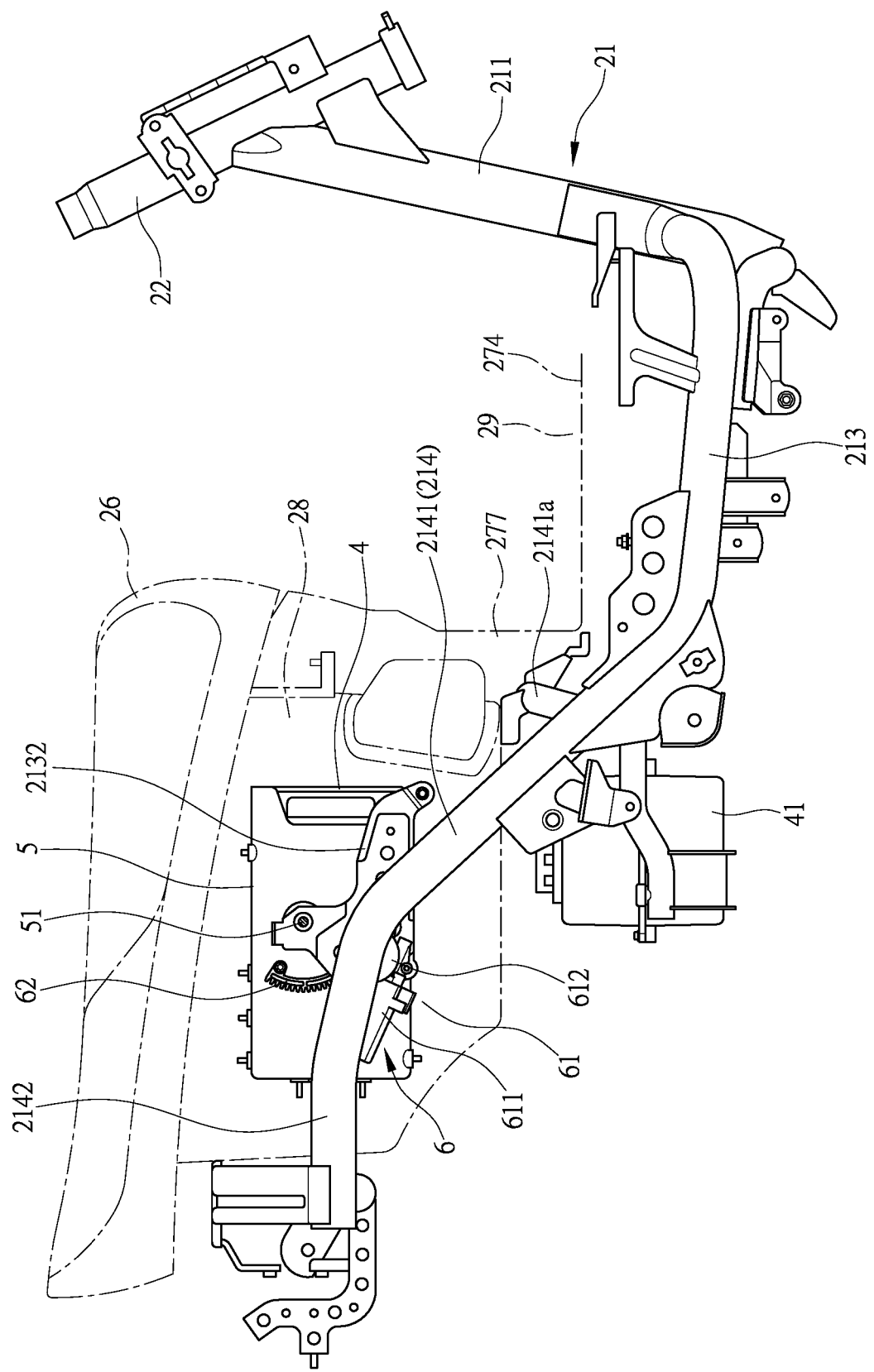
FIG. 11 shows another embodiment of the arrangement of the battery box of the electric vehicle according to the present invention.

As shown in FIG. 11, in putting the present invention into practice, the battery box 5 further can be arranged, in a manner of being shaft-supported leftward and rightward, on the side frame sections 2142 of the left and right pairwise rear frames 214 of the frame unit 21. Speaking more precisely, the battery box 5 is shaft-supported in the article storage box 28, so that the space of the electric vehicle 2 can be better utilized and the battery 4 that is received in the battery box 5 is provided with feature of shielding.

Figure 12:
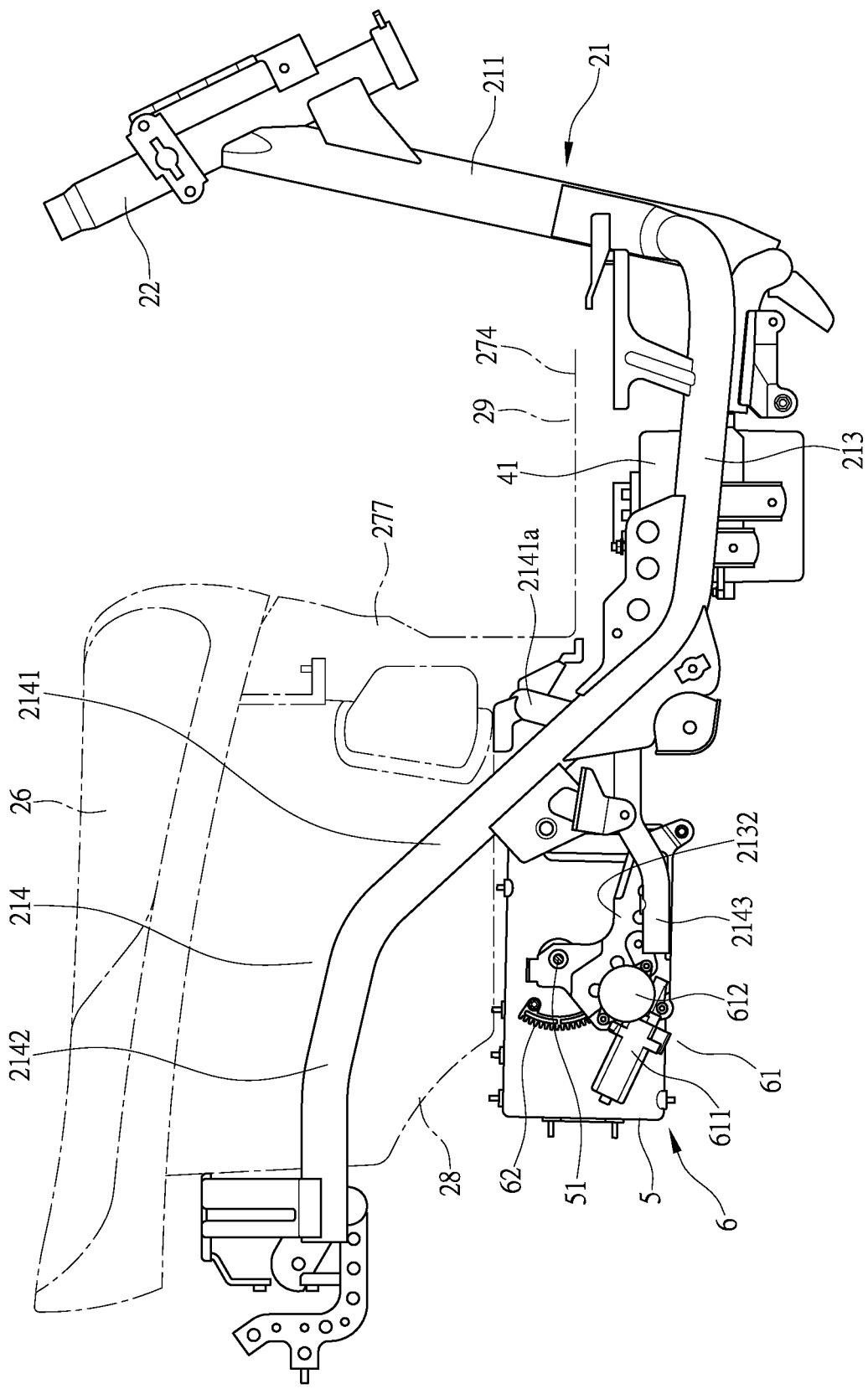
FIG. 12 shows a further embodiment of the arrangement of the battery box of the electric vehicle according to the present invention.

As shown in FIG. 12, in putting the present invention into practice, the rise sections 2141 of the left and right pairwise the rear frames 214 of the frame unit 21 are provided with a support frame 2143 projecting toward the rear side of the vehicle body. The support frame 2143 is provided to allow the battery box 5 to arrange in a manner of being shaft-supported leftward and rightward, and the second battery 41 that supplies electrical power source to the opening device 6 is stored in the foot support section 29, so that the space of the electric vehicle 2 can be better utilized and the battery 4 that is received in the battery box 5 is provided with feature of shielding.

Figure 13:
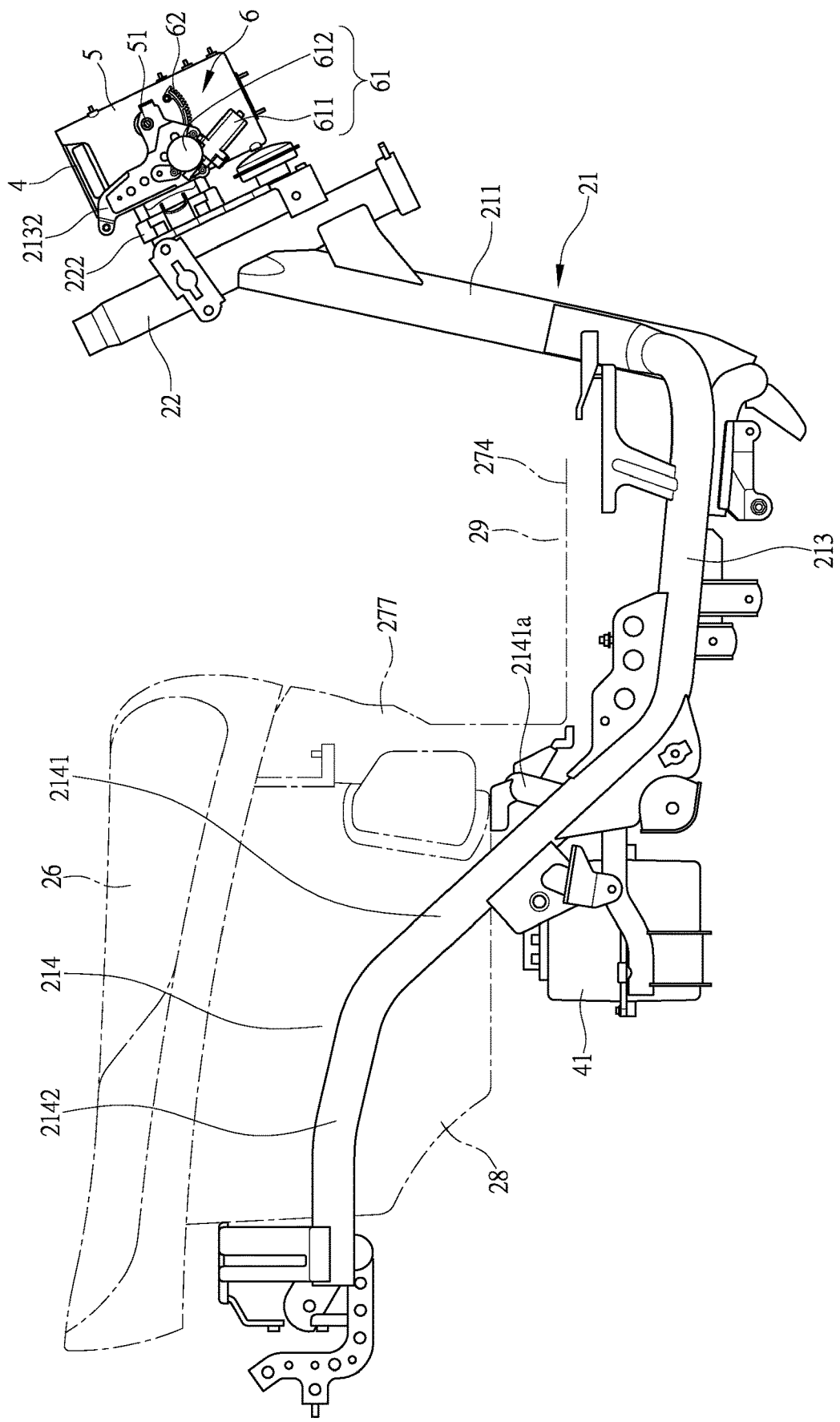
FIG. 13 shows yet a further embodiment of the arrangement of the battery box of the electric vehicle according to the present invention.

As shown in FIG. 13, in putting the present invention into practice, the head tube 22 of the frame unit 21 is provided, on a front side thereof, with a mounting frame 222. The mounting frame 222 allows the battery box 5 to arrange in a manner of being shaft-supported leftward and rightward, so that the space of the electric vehicle 2 can be better utilized and the battery 4 that is received in the battery box 5 is provided with feature of shielding.

The primary efficacy of the present invention is that two sides of the battery box 5 are provided with the support shafts 51 and the battery box 5 is supported by the support shafts 51, in a manner of being shaft-supported in the vehicle body left-right direction, on the frame unit 21, so that the battery box 5 is rotatable about a rotation center defined by the support shafts 51, in the vehicle body front-rear direction, to a open position or a storage position to thereby facilitate lifting and removal of the battery 4 from the battery box 5.

The second efficacy of the present invention is that an opening device 6 is arranged at one side of the battery box 5 and the opening device 6 comprises a power unit 61 and a driven element 62 that can be driven by the power unit 61; the power unit 61 is arranged on the right tread tube 213 and the driven element 62 is arranged on one side of a circumference of the battery box 5, so that the installation of the opening device 6 is made easy.

The third efficacy of the present invention is that the power unit 61 comprises a power motor section 611 and a transmission section 612, and the driven element 62 is in engagement with the transmission section 612, so that effects of opening and storage of the opening device 6 are ensured.

The fourth efficacy of the present invention is that the driven element 62 comprises a curved toothed rack, so that reliability of the operation of the opening device 6 is enhanced.

The fifth efficacy of the present invention is that the left tread tube 212 is provided with the left shaft support section 2121 and the right tread tube 213 is provided with the right shaft support section 2131, and the left shaft support section 2121 and the right shaft support section 2131 allow the support shafts 51 of the battery box 5 to be supported so that rotatable arrangement of the battery box 5 is made easy.

The sixth efficacy of the present invention is that the support shafts 51 of the battery box 5 are located above the battery box center axis 5a of the battery box 5 in the vehicle body front-rear direction so that opening and storage of the battery box 5 are made easy.

The seventh efficacy of the present invention is that the electrical power supply to the opening device 6 is made with a second battery 41 so that the stability of electrical power supply of the opening device 6 can be ensured.

The eighth efficacy of the present invention is that the vehicle body cover unit 27 further comprises the bottom cover 275 arranged at a lower side of the tread board 274 and when the battery box 5 is received in the receiving space A defined by the left tread tube 212, the right tread tube 213, the tread board 274 and the bottom cover 275, at least a portion of the rear end of the battery box 5 is extended further toward the rear side of the vehicle body than an orthographic projection of a front end of the seat section 26 so that interference of an enlarged battery box 5 with other components can be avoided and thereby enhance the utilization of the battery box 5.

The ninth efficacy of the present invention is that the rise sections 2141 of the frame unit 21 are provided with a transverse tube 2141a; the vehicle body cover unit 27 further comprises the bottom cover 275 at a lower side of the tread board 274; when the battery box 5 is received and stored in the receiving space A defined by the left tread tube 212, the right tread tube 213, the tread board 274 and the bottom cover 275, as viewed from the top, at least a portion of the rear end of the battery box 5 overlaps the transverse tube 2141a so that interference of an enlarged battery box 5 with other components can be avoided and thereby enhance the utilization of the battery box 5.

The tenth efficacy of the present invention is that the central vehicle body cover 277 is arranged at a lower side of a front end of the seat section 26 and when the battery box 5 is received and stored in the receiving space A defined by the left tread tube 212, the right tread tube 213, the tread board 274 and the bottom cover 275, at least a portion of the rear end of the battery box 5 is extended further toward the rear side of the vehicle body than the central vehicle body cover 277, so that interference of an enlarged battery box 5 with other components can be avoided and thereby enhance the utilization of the battery box 5.

The eleventh efficacy of the present invention is that the vehicle body cover unit 27 further comprises the bottom cover 275 at a lower side of the tread board 274 and the tread board 274 comprises a central tread board 2741 and a peripheral tread board 2742; the bottom cover 275 comprises a central bottom cover 2751 and a peripheral bottom cover 2752; the central tread board 2741 is fixed to an upper surface of the battery box 5 and the central bottom cover 2751 is fixed to a lower surface of the battery box 5; the central tread board 2741 on the upper surface of the battery box 5 and the central bottom cover 2751 fixed to the lower surface of the battery box 5 are opened in synchronization with the battery box 5 and thus, when the battery box 5 is opened in a condition of being generally at a right angle with respect to the ground surface, the rear end of the battery box 5 projects beyond a lower edge of the peripheral bottom cover 2572 in a direction toward the ground surface, so that withdrawal of the battery 4 from the battery box 5 by a user can be facilitated and at the same time, interference of an enlarged battery box 5 with other components can be avoided and thereby enhance the utilization of the battery box 5.

The twelfth efficacy of the present invention is that an article storage box 28 is provided on the side frame sections 2142 of the frame unit 21 and the battery box 5 is shaft-supported on the side frame section 2142 of the frame unit 21, in a manner of being shaft-supported in the vehicle body left-right direction, and is received in the article storage box 28, so that the space of the electric vehicle 2 can be fully used and the battery 4 received in the battery box 5 is provided with a feature of shielding.

The thirteenth efficacy of the present invention is that the left tread tube 212, the right tread tube 213, the tread board 274 and the bottom cover 275 define a receiving space A, and the receiving space A receives and holds the battery box 5 therein, so that the space of the electric vehicle 2 can be fully used and the battery 4 received in the battery box 5 is provided with a feature of shielding.

The fourteenth efficacy of the present invention is that the rise sections 2141 of the frame unit 21 are provided with a support frame 2143 projecting toward the rear side of the vehicle body and the battery box 5 is shaft-supported on the support frame 2143, in a manner of being shaft-supported in the vehicle body left-right direction, so that the space of the electric vehicle 2 can be fully used and the battery 4 received in the battery box 5 is provided with a feature of shielding.

The fifteenth efficacy of the present invention is that the head tube 22 of the frame unit 21 is provided with a mounting frame 222 projecting toward the front side of the vehicle body and the battery box 5 is shaft-supported on the mounting frame 222, in a manner of being shaft-supported in the vehicle body left-right direction, so that the space of the electric vehicle 2 can be fully used and the battery 4 received in the battery box 5 is provided with a feature of shielding.

I claim:

1. A battery box structure of an electric vehicle, wherein the electric vehicle at least comprises a frame unit and a vehicle body cover unit; the frame unit comprises tread tubes extending toward a rear side of a vehicle body, the tread tubes being arranged in a left and right pairwise form as a left tread tube and a right tread tube; the vehicle body cover unit at least comprises a tread board that shields the left tread tube and the right tread tube; a battery box is shaft-supported on the frame unit to receive and hold a battery, characterized in that the battery box has two sides that are provided with support shafts, and the battery box are shaft-supported on the frame unit by the support shafts in a vehicle body left-right direction, so that the battery box is rotatable about a rotation center defined by the support shafts in a vehicle body front-rear direction to an open position or a storage position.

2. The battery box structure of the electric vehicle according to claim 1, wherein an opening device is arranged at one side of the battery box and the opening device comprises a power unit and a driven element drivable by the power unit; and the power unit is arranged on the tread tubes and the driven element is arranged at one side of a circumference of the battery box.

3. The battery box structure of the electric vehicle according to claim 2, wherein the power unit comprises a power motor section and a transmission section, and the driven element is in engagement with the transmission section.

4. The battery box structure of the electric vehicle according to claim 2, wherein the driven element comprises a curved toothed rack.

5. The battery box structure of the electric vehicle according to claim 1, wherein the left tread tube comprises a left shaft support section and the right tread tube comprises a right shaft support section, the left shaft support section and the right shaft support section shaft-supporting the support shafts of the battery box.

6. The battery box structure of the electric vehicle according to claim 1, wherein the support shafts of the battery box are located above a battery box center axis of the battery box in the vehicle body front-rear direction.

7. The battery box structure of the electric vehicle according to claim 2, wherein the opening device has an electrical power source supplied with a second battery.

8. The battery box structure of the electric vehicle according to claim 1, wherein the frame unit further comprises a seat section; the vehicle body cover unit further comprises a bottom cover at a lower side of the tread board; the battery box is received in a receiving space defined by the left tread tube, the right tread tube, the tread board and the bottom cover and at least a portion of a rear end of the battery box extending further toward the rear side of the vehicle body than an orthographic projection of a front end of the seat section.

9. The battery box structure of the electric vehicle according to claim 1, wherein the frame unit further comprises a rise section, the rise section being provided with a transverse tube; the vehicle body cover unit further comprises a bottom cover arranged at a lower side of the tread board; the battery box is received in a receiving space defined by the left tread tube, the right tread tube, the tread board and the bottom cover and when viewed from the top, at least a portion of a rear end of the battery box overlaps the transverse tube.

10. The battery box structure of the electric vehicle according to claim 1, wherein the frame unit comprises a seat section, and the vehicle body cover unit comprises a central vehicle body cover; the central vehicle body cover is arranged at a lower side of a front end of the seat section, the battery box being received in a receiving space defined by the left tread tube, the right tread tube, the tread board and the bottom cover, at least a portion of a rear end of the battery box extending further toward the rear side of the vehicle body than the central vehicle body cover.

11. The battery box structure of the electric vehicle according to claim 1, wherein the vehicle body cover unit further comprises a bottom cover arranged at a lower side of the tread board; the tread board comprises a central tread board and a peripheral tread board; the bottom cover comprises a central bottom cover and a peripheral bottom cover; the central tread board is fixed to an upper surface of the battery box and the central bottom cover is fixed to a lower surface of the battery box; the central tread board on the upper surface of the battery box and the central bottom cover fixed to the lower surface of the battery box are openable in synchronization with the battery box, so that when the battery box is opened to a condition of being generally at a right angle with respect to a ground surface, the rear end of the battery box projects beyond a lower edge of the peripheral bottom cover in a direction toward the ground surface.

12. The battery box structure of the electric vehicle according to claim 1, wherein the frame unit comprises side frame sections arranged in a left and right pairwise form, an article storage box being provided on the side frame sections of the frame unit, the battery box being shaft-supported on the side frame sections of the frame unit in a manner of being shaft-supported in the vehicle body left-right direction, and is received in the article storage box.

13. The battery box structure of the electric vehicle according to claim 1, wherein the left tread tube, the right tread tube, the tread board and the bottom cover define a receiving space, and the receiving space receives the battery box therein.

14. The battery box structure of the electric vehicle according to claim 1, wherein the frame unit further comprises a rise section, the rise section of the frame unit being provided with a support frame projecting toward the rear side of the vehicle body, the battery box being shaft-supported on the support frame in a manner of being shaft-supported in the vehicle body left-right direction.

15. The battery box structure of the electric vehicle according to claim 1, wherein the frame unit further comprises a head tube, the head tube of the frame unit being provided with a mounting frame projecting toward a front side of the vehicle body, the battery box being shaft-supported on the mounting frame in a manner of being shaft-supported in the vehicle body left-right direction.

16. The battery box structure of the electric vehicle according to claim 3, wherein the driven element comprises a curved toothed rack.

17. The battery box structure of the electric vehicle according to claim 5, wherein the support shafts of the battery box are located above a battery box center axis of the battery box in the vehicle body front-rear direction.

18. The battery box structure of the electric vehicle according to claim 8, wherein the frame unit comprises a seat section, and the vehicle body cover unit comprises a central vehicle body cover; the central vehicle body cover is arranged at a lower side of a front end of the seat section, the battery box being received in a receiving space defined by the left tread tube, the right tread tube, the tread board and the bottom cover, at least a portion of a rear end of the battery box extending further toward the rear side of the vehicle body than the central vehicle body cover.

19. The battery box structure of the electric vehicle according to claim 8, wherein the vehicle body cover unit further comprises a bottom cover arranged at a lower side of the tread board; the tread board comprises a central tread board and a peripheral tread board; the bottom cover comprises a central bottom cover and a peripheral bottom cover; the central tread board is fixed to an upper surface of the battery box and the central bottom cover is fixed to a lower surface of the battery box; the central tread board on the upper surface of the battery box and the central bottom cover fixed to the lower surface of the battery box are openable in synchronization with the battery box, so that when the battery box is opened to a condition of being generally at a right angle with respect to a ground surface, the rear end of the battery box projects beyond a lower edge of the peripheral bottom cover in a direction toward the ground surface.

20. The battery box structure of the electric vehicle according to claim 9, wherein the vehicle body cover unit further comprises a bottom cover arranged at a lower side of the tread board; the tread board comprises a central tread board and a peripheral tread board; the bottom cover comprises a central bottom cover and a peripheral bottom cover; the central tread board is fixed to an upper surface of the battery box and the central bottom cover is fixed to a lower surface of the battery box; the central tread board on the upper surface of the battery box and the central bottom cover fixed to the lower surface of the battery box are openable in synchronization with the battery box, so that when the battery box is opened to a condition of being generally at a right angle with respect to a ground surface, the rear end of the battery box projects beyond a lower edge of the peripheral bottom cover in a direction toward the ground surface.

* * * * *